United States Patent Office 3,497,719
Patented Feb. 24, 1970

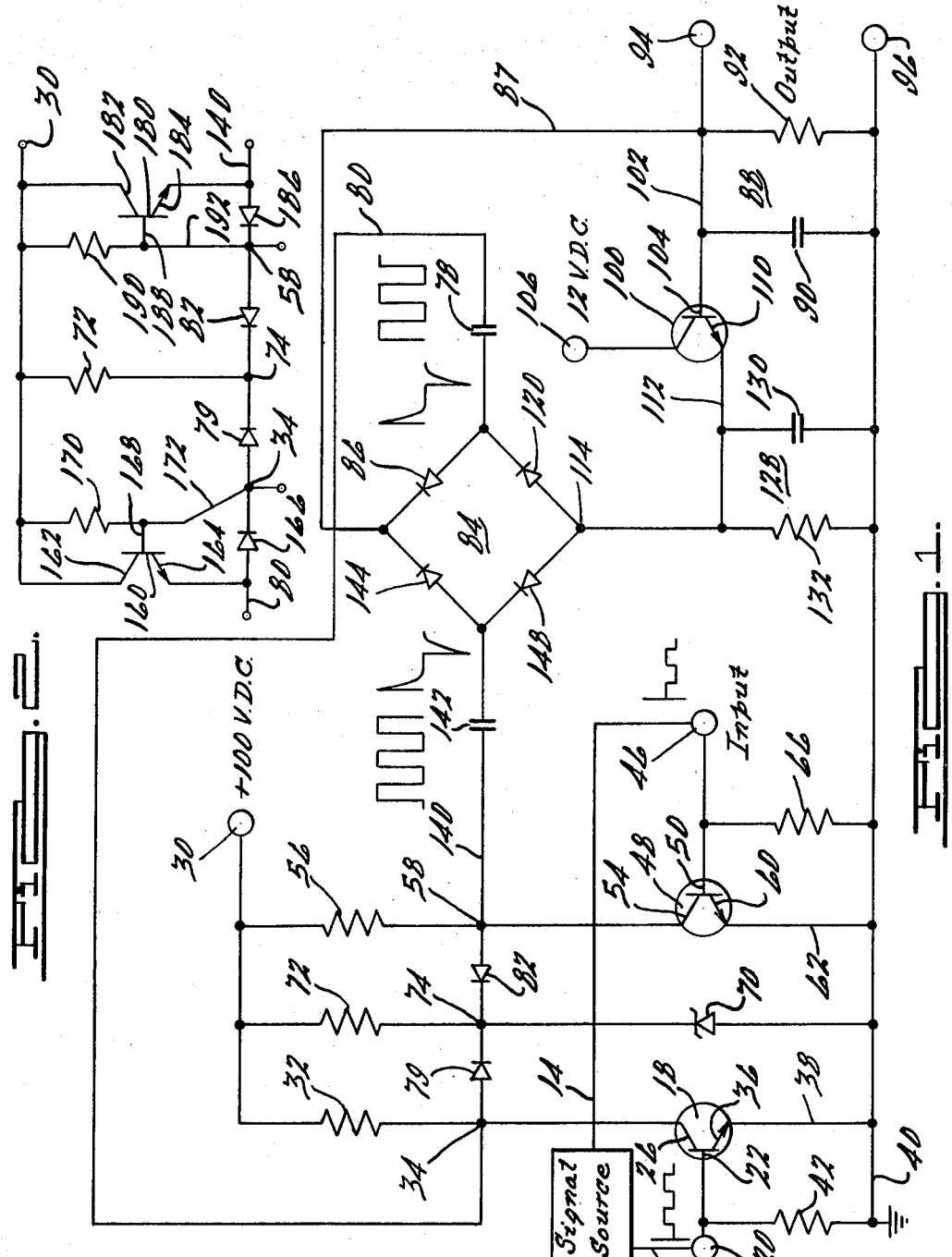

3,497,719
FREQUENCY MEASURING SYSTEM EMPLOYING FEEDBACK NETWORK TO PROVIDE LINEAR DC OUTPUT FROM INHERENT NON-LINEARITY OF SYSTEM
George Scourtes, Detroit, Mich., assignor to Cox Instruments Division Lynch Corporation, Detroit, Mich., a corporation of Indiana
Filed June 11, 1965, Ser. No. 463,074
Int. Cl. H03k 5/20
U.S. Cl. 307—233
27 Claims

ABSTRACT OF THE DISCLOSURE

The invention related to a system for producing a direct voltage having a magnitude which varies in accordance with the frequencies of a pulsating signal. A pair of input square wave signals 180° out of phase with respect to one another are fed to a pair of NPN transistors having their collector electrodes connected to a pair of clamping diodes. The outputs of the connections between the collector electrodes and clamping diodes are fed to a full wave rectifier bridge having a pair of differentiating capacitors. The capacitors are in series with an integrating circuit across which an output direct current signal is derived. The voltage magnitude of the output signal is proportional to the input frequency of the square wave pulses and is fed back as a charge on the capacitors in the differentiating circuit. This charge or frequency responsive bias on the differentiating capacitors allows for a large output signal to be derived at the output circuit having a minimum time constant while still maintaining the proper linearity of the output signal in accordance with the frequency of the input signal.

---

This invention relates generally to frequency measuring equipment, and more particularly to a system for producing a direct voltage having a magnitude which varies in accordance with the frequency of a pulsating signal.

While the principles of the present invention, as described and represented herein, are embodied in an apparatus for presenting a continuous and direct indication of the rate of flow of a fluid through a conduit, it is to be understood that the same inventive principles may be readily applied to the measuring and indicating of other variable conditions, including, for example, the pressure of a fluid, the rate of rotation or translational motion of an object, the sum of difference of any plurality of certain conditions which may be represented by cyclic rates, etc. In general, the invention is readily adaptable for use in measuring and indicating any condition or characteristic, or plurality thereof, which may be reflected, by use of appropriate transducers, as a series of electrical pulses, the frequency or frequencies of which vary in accordance with the changes in the condition or characteristic which is desired to be measured and indicated.

In the flowmeter art, as well as other fields, wherein it is desired to measure and indicate a condition which is evidenced by a low amplitude, widely varying frequency signal, certain problems arise. In providing measuring and indicating assemblies, care must be taken to insure that the translating circuitry produces an output signal which is sufficient in amplitude, linear in response and has adequate recovery characteristics to insure that the assembly will respond to low amplitude and wide variation in frequency of the input signals. In practice, the input signal to the frequency measuring circuit illustrated is of the order of .6 of a volt at a frequency of approximately .05 to 30 kilocycles. It is to be understood that the invention may be readily adapted to respond to a frequency range of much greater magnitude. From this signal, it is desired to produce a direct current signal having an amplitude of the order of 5 to 10 volts at the highest frequency to be measured and which varies linearly as the frequency decreases. It is to be understood that the invention may be utilized to produce output voltages of a greater magnitude by the proper choice of circuit parameters. Also, while the output signal is herein described as being of a voltage of a particular magnitude, the circuit may be modified to produce an output current which varies in accordance with the input frequency or frequencies. The present invention, embodied in the circuit illustrated for examplification purposes only, is calculated to achieve the above mentioned purposes.

In general, in the disclosed arrangement, a pulsating source of signals, which may take the form of a train of alternating generally square pulses of unknown frequency or a pulsating train of substantially any form recurring at an unknown rate, is impressed on a frequency sensitive circuit. The pulses may be generated in any suitable manner, as for example, by a transducer sensing the rotation of a turbine wheel blade in a fluid wherein an alternating sinusoidal output is amplified and limited to produce a pulsating signal train of low peak amplitude. This signal is in turn formed by suitable circuitry into a train of square wave pulses having a substantially constant peak amplitude and having a frequency related to the frequency of the pulsating signal. These pulses may be produced by any suitable method, as for example, by the methods illustrated in Patents 2,955,202, issued Oct. 4, 1960, and 2,983,907, issued May 9, 1961. These limited square wave pulses are fed to a differentiating network through an amplifying and clamping circuit, to produce a first and second series of output spikes. In the preferred arrangement, each of the output spikes is of a constant energy, the total energy, or the average energy, of the train varying in accordance with the repetitive rate of the spikes. The series of spike pulses are integrated through suitable integrating circuitry to produce a direct current output wherein the amplitude of the output is directly related to the frequency of the input pulses. Thus, an output signal is produced, in the form of a direct voltage, having a magnitude which varies in accordance with the frequency of the pulsating input signal.

More specifically, and in one embodiment of the invention, a pair of input square wave signals, which may be signals of a different frequency or wherein one train is 180° out of phase with the other, are fed to a pair of NPN transistors having their collector electrodes connected to a pair of clamping diodes which are supplied with a suitable source of electrical energy from a direct current source. The outputs of the connections between the collector electrode and the clamping diodes are fed to the two input terminals of a full wave rectifying bridge through a pair of differentiating capacitors. The capacitors are in series, through arms of the bridge, with an integrating circuit having a resistor and filter capacitor, across which an output direct current signal is derived. The voltage magnitude of the output signal is seen to be in proportion to the input frequency of the square wave pulses. The charge on the capacitor in the differentiating circuit, which also includes the resistor of the integrating circuit in the preferred embodiment, is determined by the frequency of the input square wave pulses. Thus, by the proper choice of a time constant for the differentiating circuit, a specified magnitude of output signal may be derived. The time constant of the differentiating circuit is chosen, in the preferred embodiment, to assume a lesser value than that of the minimum pulse spacing of the input signal.

In prior art frequency converters of the type described above, it has been the practice to totally discharge the capacitors contained in the differentiating circuit to the input arms of the bridge. In order to properly discharge the differentiating circuit, it has been necessary to provide a time constant in the differentiating circuit which is of such a magnitude as to produce an output signal of a very low amplitude. Accordingly, an output amplifier has been provided in prior art devices of this type to raise the level of the output signal to the desired level necessary for operating the indicating devices.

In order to alleviate this problem, a frequency net biasing circuit has been provided in the frequency measuring circuit which is responsive to the output signal voltage, or in certain cases to the current level, to bias the frequency responsive differentiating circuit thereby maintaining a bias voltage on the differentiating circuit, which bias varies in accordance with the output signal at the output terminals. In this way, a large output signal may be derived from an output circuit having a minimum time constant while still maintaining the proper linearity of the output signal in accordance with the frequency of the input signal.

In a preferred embodiment of the invention, the biasing circuit includes an emitter follower circuit having a base electrode connected to one of the output terminals to receive a biasing signal which is equal to the voltage level of the output signal. The emitter electrode is connected to each side of the differentiating capacitor through the respective discharge legs of the full wave bridge to impress the output of the transistor on one side of each of the differentiating capacitors. In this way the differentiating capacitors are biased to a level which is equivalent to the level of the output signal and varies in accordance with the output signal. Also, the next succeeding input signal to the differentiating capacitors will be of such a level as to add to the bias of the capacitors and will rise above that biasing level the necessary voltage to indicate the increase in frequency. Accordingly, the corresponding output spike from the differentiating capacitors will be of such a level as to compensate for the additional voltage at the output terminals due to the previous spike. In this manner, the circuit is self-compensating in its output signal for the bias voltage applied to the differentiating capacitors.

In another embodiment of the present invention, certain high level impedances have been replaced by low impedance devices to increase output current characteristics of the circuit. In the specific embodiment shown for illustrative purposes only, low impedance transistors have been included in the pulsing circuit to the differentiating circuit, thereby increasing the current being fed to the differentiating circuit. This increased current is reflected in the output, which may be utilized to drive a current responsive output indicating device as for example a meter. In this situation, the output resistor in the integrating circuit is eliminated and the frequency net biasing circuit is made to be responsive to the output current.

Accordingly, it is one object of the present invention to provide an improved frequency measuring circuit.

It is another object of the present invention to provide an improved frequency measuring circuit wherein an output signal is produced having an amplitude characteristic which is linearly related to the frequency of the input signal.

It is still another object of the present invention to provide an improved frequency measuring circuit of the type described wherein the output signal is utilized to bias a frequency responsive network in the frequency measuring circuit.

It is still another object of the present invention to provide a frequency measuring circuit having improved output signal level characteristics.

It is still a further object of the present invention to provide a frequency measuring circuit having a self-compensating biasing network.

It is another object of the present invention to provide an improved frequency measuring circuit having an analogue output voltage proportional to the frequency of the input signal wherein the linearity characteristics of the output signal are greatly improved.

It is still a further object of the present invention to provide a frequency responsive measuring circuit having improved current amplitude characteristics.

It is another object of the present invention to provide an improved, low impedance circuit for supply pulses to a frequency responsive circuit.

Another object of the present invention is to prevent zero offset error, a common problem in utilizing direct current output amplifiers to boost the output signal.

Further objects, features, and advantages of this invention will become apparent from a consideration of the following description, the appended claims and the accompanying drawing in which:

FIGURE 1 is a schematic diagram illustrating one embodiment of a preferred form of the present invention; and FIGURE 2 is a schematic diagram of a portion of an alternative form of the invention illustrated in FIGURE 1.

Referring now to FIGURE 1, the input pulsating voltage is derived from any suitable source 10, represented in block diagrammatic form. The source which is employed in block diagram 10 may be a flowmeter actuated pulse generator as, for example, the source pulse generator described in the above mentioned Patent 2,955,202. The pulsating signal from the flowmeter may be sinusoidal, may consist of a series of spikes, or may assume any other recurrent form, preferably varying in frequency or recurrence rate in a determined relation with the state or rate of change of some condition which is desired to be measured and indicated. Also, the circuit may be utilized to indicate the sum of two input pulse trains from two or more flowmeter sources.

The source 10 of output pulses provides a pair of output trains or pulses on conductors 12 and 14, the pulses on conductor 14 being shown, purely for illustrative purposes, as being 180° out of phase with those impressed on conductor 12. The out of phase trains of pulses may be provided by an inverter circuit or producing an alternating train of pulses with a diode network to direct each half wave of pulses to conductors 12 and 14, respectively. The amplitude of the pulses are of sufficient magnitude to provide a biasing signal for a transistor, of the order of approximately .6 of a volt. However, the signal level above the biasing point is not critical due to a plurality of clamping circuits provided, as will be hereinafter explained. Referring first to the train of pulses impressed on conductor 12, the pulses are supplied to a transistor 18, representatively illustrated as an NPN transistor, through an input terminal 20 and a base electrode 22. The transistor 18 employs a collector electrode 26 connected to a positive source of direct current potential, as for example 100 volts direct current, through an input terminal 30 and a limiting resistor 32. The lower end of the limiting resistor is connected to the collector electrode 26 through a node connection 34. An emitter electrode 36 of transistor 18 is connected to ground potential through a conductor 38 and a second conductor 40. The emitter electrode is not clamped due to the nearly perfect switching characteristics of a transistor. A suitable base-emitter biasing resistor 42 is connected between a base electrode 22 and emitter electrode 36, as is common in the art.

With the positive going input pulses being successively applied to the base electrode 22, the transistor 18 is successively rendered conductive inasmuch as the amplitude of the positive going signal is sufficient to bias the transistor 18 to the conductive state. When the input pulse drops below the biasing potential, the transistor 18 is again rendered nonconductive. Accordingly, the node 34 will be driven to some large direct current potential below the 100 volt direct current potential at the input terminal 30 when the transistor 18 is nonconductive, and the potential at node 34 will drop to zero, or substantially zero, when the transistor 18 is rendered conductive or in the saturation state, depending on the amplitude of the input pulse to the base electrode 22.

Referring now to the second signal source, impressed on conductor 14, the train of pulses is impressed on an input terminal 46 which is connected to a second transistor 48, representatively illustrated as of the NPN type, through its base electrode 50. As in the case of transistor 18, a collector electrode 54 is connected to the 100 volt direct current source at terminal 30 through a current limiting resistor 56 and a node connection 58. The emitter 60 is grounded through a conductor 62 connected to the conductor 40. As is common in the art, a base-emitter bias resistor 66 is connected between the base electrode 50 and the conductor 40 connected to the emitter electrode 60. With the train of input pulses being impressed on base electrode 50, the transistor 48 will be alternatively rendered nonconductive and conductive wherein node 58 rises to a high positive voltage and thence to substantially ground, respectively. As in the previous case, it is not necessary to clamp the emitter electrode.

Clamping circuit means is provided to limit the upper voltage level at which nodes 34 and 58 will rise and generally comprises a constant voltage means 70, representatively illustrated as a Zener diode, the Zener diode being connected to the input terminal 30 by means of a current limiting resistor 72 and a node 74. From the series circuit including terminal 30 through resistor 72, node 74 and Zener diode 70, it will be seen that the voltage at node 74 will remain substantially constant provided the voltage connected to terminal 30 is above the Zener avalanche voltage of the Zener diode 70. In the preferred embodiment, a Zener diode has been chosen having an 80 volt avalanche voltage thereby clamping node 74 at an 80 volt level. The node 74 is connected to nodes 34 and 58 through a pair of diodes 79 and 82, respectively. As is well known in the art, the diodes 79 and 82 provide a voltage drop, when forward biased, of approximately .6 of a volt thereby rendering nodes 74 and 58 at a potential of approximately 80.6 volts.

Accordingly, when transistors 18 and 48 are nonconductive, the voltage at nodes 34 and 58 will be, in the preferred embodiment, at a constant 80.6 volts and when transistors 18 and 48 are rendered alternately conductive, the nodes 34 and 58 will alternately be rendered at voltage levels of approximately ground and .1 of a volt, depending on the voltage drop across the collector-emitter electrodes of transistors 18 and 48. Therefore, the output signal at the node 34 will ultimately rise to a potential of 80.6 volts and drop to approximately zero volts potential in a square wave signal configuration. Similarly, node 58 will rise to a signal voltage level of 80.6 volts when transistor 48 is nonconductive, during the period when transistor 18 is conductive, and subsequently will be lowered to approximately ground potential when the transistor 48 is rendered conductive, during the period when transistor 18 is rendered nonconductive.

Referring particularly to the signal being produced at node 34, it is seen that the square wave output pulses of magnitude 80.6 volts, are fed to a capacitor 78 by means of a conductor 80 whereby the leading edge of the pulse produces a positive going spike and the trailing edge produces a negative going spike, the two spikes being of approximately equal magnitudes. This initial condition applies solely when the capacitor 78 is completely discharged, as will be seen from the remainder of the description. The positive pulse of the output of differentiating capacitor 78 is fed to a full wave bridge circuit 84, by means of diode leg 86 and the output of the diode 86 is fed, through a conductor 87, to an integrating circuit 88 consisting of capacitor 90 and output resistor 92.

The pulse at initial starting conditions will charge capacitor 90 to a certain direct current level determined by the values of certain elements including capacitor 90, resistor 92 and capacitor 78. It is to be noted that the charging time constant of the circuit including capacitor 78 will be chosen such that the charging time constant is less than the minimum pulse duration of the input frequency signal. On the other hand, the discharge time constant of circuit 88 is chosen to be greater than the maximum pulse duration of the input signal. By discharge time constant in this sense, it is to be understood that the discharge time constant is the time constant of capacitor 90 and resistor 92 in series, or the discharge path of capacitor 90 through resistor 92. Thus a direct current output voltage level will be maintained on tank or filter capacitor 90 to produce an output signal at output terminals 94, 96. This direct current output signal will vary in proportion to the frequency of the input signal inasmuch as the frequency directly determines the amount of charge or discharge of capacitor 90.

As stated above, the frequency responsive network is provided with a bias signal, the amplitude of which is determined by the output signal amplitude. To this end, the output signal level at terminal 94 is fed through a transistor 100 by means of conductor 102 connected to the base electrode 104 of the transistor 100. The collector of transistor 100 is connected by means of an input terminal 106 to a suitable source of direct current potential as, for example 12 volts, and the emitter electrode 110 is connected by means of a conductor 112 to an output terminal 114 of the full wave bridge 84.

In this way, the output signal on conductor 102, or output terminal 94, is fed through the base emitter circuit of transistor 100 to the terminal 114 of the bridge 84. This signal is then fed to the capacitor 78 of the frequency responsive net, comprising capacitor 78, diode 86 and integrating circuit 88, by means of a diode leg 120. Thus the left side of the differentiating capacitor 78 is charged to a potential which is nearly approximate to the output potential at output terminal 94, which is at 4 volts for the example given. This output potential will differ at point 114, and thus the left plate of capacitor 78, from the potential output terminal 94 by the drop in potential between the base 104 and emitter 110 electrodes of transistor 100.

Thus, when the second pulse is received on conductor 80, the left side of capacitor 78 is charged to approximately 3.4 volts and the input signal of 80.6 volts will produce an output signal to diode leg 86 of approximately 84 volts. This 84 volt signal is fed through conductor 87 to the integrating circuit 88 which is now charged to a positive potential of approximately 4 volts for a certain frequency. It is to be understood that this 4 volt signal level has been chosen for illustrative purposes only to represent a given frequency between the ranges of 10 to 1000 cycles. This voltage is variable, within limits, by the variation of circuit parameters, as for example, capacitors 78 and 90 and resistor 92, particularly capacitor 78. Thus, with the 84 volt signal level on conductor 87, the potential remaining on output terminal 94 will be self-compensating, and the direct level at output terminal 94 will remain constant for any given frequency.

In analyzing the effects of the above described biasing circuit, note may be taken of the operation of the circuit in the absence of the biasing circuit. After the first pulse, the filter capacitor will be charged to a voltage corresponding to the output voltage. The next pulse to the differentiating capacitors will be required to rise to a voltage greater than the output voltage in order to forward bias the diode of the bridge circuit. Accordingly, the lower portion of the spike through the differentiating capacitor will be eliminated from the output circuit. As the output voltage varies, the portion of the spike which is eliminated is at the bottom of the pulse, or the region of greatest nonlinearity. In view of the fact that a portion of the spike curve is exponential, the variation in output signal is nonlinear with variations in frequency. The biasing circuit of the present invention sets the level of the differentiating circuit to allow the entire spike to pass to the output circuit. Thus the output signal will remain linear throughout the operating range of the system.

A filtering circuit for the output signal from transistor 100 is provided in filter circuit 128 comprising a capacitor 130 and resistor 132. Thus, the constant pulsing through conductor 87 will maintain the charge at the output terminal 94 to a certain direct current level in accordance with the frequency input and also the capacitor 130 will be charged to a voltage level which is approximately .6 of a volt less than the direct current output signal at terminal 94, or approximatey 3.4 volts for the example given. Thus the linearity of the circuit is greatly enhanced due to the biasing of the frequency responsive network, particularly capacitor 78, by means of the output signal. As this output signal varies in accordance with the frequency, the biasing signal to capacitor 78 will also vary, thereby rendering the entire circuit self-compensating.

From the foregoing, it is seen that the capacitor 78 is not discharged to zero for each pulse, but rather to a potential of approximately 3.4 to 4 volts, for the example given. The discharge path for the capacitor 78 is provided through conductor 80, the collector 26-emitter 36 path of transistor 18, resistor 132, diode leg 120 back to the capacitor 78. As in the situation with integrating circuit 88, the filter circuit 128 (which also acts as an integrating circuit) has a high discharge time constant, that is, higher than the pulse duration of the lowest frequency input which is expected to be impressed on the circuit.

Referring now to the output of transistor 48, it is seen that the potential at node 58 varies from the maximum clamped voltage determined by diode 82 and Zener diode 70 to approximately zero voltage, determined by the collector-emitter drop of transistor 48, when the transistor is in the conductive state. This pulsating signal, being 180° out of phase with the signal impressed on conductor 80, is fed through a conductor 140 to the left side of a differentiating capacitor 142. As in the situation with capacitor 78, the output wave form of capacitor 142 will include a positive going spike, due to the leading edge rise of the input pulse, and a negative spike generated by the trailing edge of the input pulse. The positive spike of the output wave of capacitor 142 is passed through a diode leg 144 to the integrating circuit 88 by means of conductor 87 in the same direction as the pulse from capacitor 78. The biasing of differentiating capacitor 142 is accomplished through the last leg 148 of full wave bridge 84, also connected to node 114. As in the situation above, the node 114 receives an input biasing signal from transistor 100 to bias the frequency net in accordance with the output voltage level. By way of specific example, a typical circuit which is adapted to be responsive to a frequency range of 0 to 1000 cycles produces an output current of one milliamp at five volts. In this case, the capacitors will be chosen to be of .01 microfarad, the filter capacitor 90 to be 10 microfarads and the output resistor 92 to have a value of 5K ohms. Obviously these values may be changed to produce other conditions.

In the embodiment illustrated in FIGURE 2, the effect of resistors 32, 56 as high impedances to the flow of current has been eliminated and low impedance devices have been substituted therefor. Referring to FIGURE 2, an NPN transistor 160 has been inserted into the circuit of FIGURE 1 such that the collector 162 thereof is connected to the 100 volt power supply 30 and the emitter 164 is connected to the node 34 through a diode 166. The emitter 164 is also connected to the capacitor 78 of the differentiating circuit through the conductor 80. The base 168 is connected to both the power supply 30 through a resistor 170 and to the node 34 through a conductor 172.

Thus the collector-emitter circuit of transistor 160, in series circuit with the collector-emitter circuit of transistor 18, is non-conducting when transistor 18 is conducting and the series circuit, with the capacitor, through transistor 18 determines the low point of the voltage swing while the series circuit through the transistor 160 determines the high point of the swing when the transistor 18 is non-conducting. In this way, the current through the capacitor may assume a high value due to the low impedance of the emitter-collector circuit of transistor 160. Accordingly, the output current at terminals may assume a high value in the event a current responsive load indicating device is to be utilized.

A second transistor 180 is similarly connected in series circuit with the source of direct current potential at terminal 30 wherein a collector electrode 182 is connected to terminal 30 and an emitter electrode 184 is connected to conductor 140. A diode 186 is connected between conductor 140 and node 58 and a base electrode 188 is connected to terminal 30 through a resistor 190 and to node 58 by means of a conductor 192. The base-emitter current for transistor 180 is supplied from terminal 30 and resistor 190. When transistor 48 is conducting, the collector-emitter circuit is supplied with current from resistor 170 and when transistor 48 is nonconducting, the current from transistor 180 is supplied to the load circuit through capacitor 142. Thus, a low impedance device is provided in lieu of the high impedance, current limiting resistor 56, or 32 in the case of transistor 160.

A frequency measuring circuit has been provided which is quick to recover from the preceding input pulse and has been provided with self-compensating features to compensate for variations in signal level, supply voltage and circuit parameters. Also, the circuit has been provided with a biasing means for biasing the frequency responsive net from a signal derived from the output signal, the circuit being fully compensated in its output for the biasing signal.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:
1. In a system for measuring the frequency of a pulsating input signal by producing a direct voltage having a magnitude which varies linearly with the frequency of the pulsating input signal the combination of, frequency responsive net means for producing a varying direct current output signal which varies nonlinearly with the frequency of the pulsating signal, and feedback biasing means connected to the output of the frequency responsive net means and responsive to said varying output signal there- of for compensating for the nonlinearity of said frequency responsive net means to thereby produce a linearly responsive direct current output.

2. In the system of claim 1 further including means responsive to said signal for producing a pulse train having a fixed maximum amplitude and a frequency controlled by the frequency of the pulsating signal.

3. In the system of claim 1 wherein said frequency responsive net includes a differentiating circuit for producing pulses in accordance with the input frequency.

4. In the system of claim 1 further including means responsive to said signal for producing a pulse train having a fixed maximum amplitude and a frequency controlled by the frequency of the pulsating signal.

5. In the system of claim 1 wherein said frequency responsive net includes an integrating circuit for integrating signals generated in response to said input signals.

6. In the system of claim 5 further including means responsive to said signal for producing a pulse train having a fixed maximum amplitude and a frequency controlled by the frequency of the pulsating signal.

7. In the system of claim 1 wherein said frequency responsive net includes a differentiating circuit for producing substantially constant energy spike pulses in accordance with the input frequency and an integrating circuit for integrating the signals generated by said differential circuit in responsive to said input signals.

8. In the system of claim 7 further including means responsive to said signal for producing a pulse train having a fixed maximum amplitude and a frequency controlled by the frequency of the pulsating signal.

9. In a system for measuring the frequency of a plurality of pulsating input signals by producing a direct voltage having a magnitude which varies linearly with the sum of the frequencies of the pulsating input signals the combination of, means responsive to said signals including clamping circuit means for producing a plurality of pulse trains each having a fixed maximum amplitude and a frequency controlled by the frequency of the pulsating signals, frequency responsive net means for producing a varying direct current output signal which varies nonlinearly with the frequency of the pulsating signal, and feedback biasing means responsive to said varying output signal thereof for compensating for the nonlinearity of said frequency responsive net means to thereby produce a linearly responsive direct current output.

10. In the system of claim 5 wherein said biasing means is responsive to said varying output signal for biasing said frequency responsive net in accordance with the amplitude of said varying output signal.

11. In the system of claim 9 wherein said net means includes a differentiating circuit for producing spike pulses in accordance with the input frequency.

12. In the system of claim 9 wherein said biasing means is responsive to said varying output signal for biasing said frequency responsive net in accordance with the amplitude of said varying output signal, said frequency responsive net including a differentiating circuit for producing substantially constant energy spike pulses in accordance with the input frequency and an integrating circuit for integrating the signals generated by said differential circuit in response to said input signals.

13. In a system for measuring the frequency of a plurality of trains of pulsating input signals by producing a direct current signal having a magnitude which varies linearly with the sum of the frequencies of the pulsating signals, the combination of common emitter transistor amplifier means for producing an output signal having a frequency which varies in accordance with the frequency of at least one of the input trains of signals, clamping means including voltage reference means for limiting the amplitude of said output signals from said transistor means, frequency responsive net means including first and second differentiating circuit means connected to said transistor means for producing positive and negative differentiated signals in response to said output signals, bridge means for blocking at least one of said positive and negative signals, and integrating circuit means connected to said first and second differentiating circuit means for producing a variable direct current output signal which varies nonlinearly with the sum of the frequencies of said input signal trains, and feedback biasing means connected to the frequency net means and responsive to said varying output signal for compensating for the nonlinearity of said frequency responsive net means to thereby produce a linearly responsive direct current output.

14. In a system for measuring the frequency of a plurality of trains of pulsating input signals by producing a direct current having a magnitude which varies linearly with the sum of the frequencies of the pulsating signals, the combination of common emitter transistor amplifier means including first and second transistor means for producing an output signal having a frequency which varies in accordance with the frequency of at least one of the input trains of signals, clamping means including voltage reference means for limiting the amplitude of said output signals from said transistor means, frequency responsive net means including first and second differentiating circuit means connected to said first and second transistor means respectively for producing positive and negative differentiated signals in response to said output signals, and integrating circuit means connected to said first and second differentiating circuit means for producing a variable direct current output signal which varies nonlinearly with the sum of the frequencies of said input signal trains, and feedback biasing means connected to the frequency net means and responsive to said varying output signal for compensating for the nonlinearity of said frequency responsive net means to thereby produce a linearly responsive direct current output.

15. In a system for measuring the frequency of a plurality of trains of pulsating input signals by producing a direct current having a magnitude which varies linearly with the sum of the frequencies of the pulsating signals, the combination of common emitter transistor amplifier means for producing an output signal having a frequency which varies in accordance with the frequency of at least one of the input trains of signals, clamping means including voltage reference means for limiting the amplitude of said output signals from said transistor means, frequency responsive net means connected to said transistor means respectively for producing positive and negative differentiated signals in response to said output signals, and integrating circuit means responsive to said differentiated signals for producing a variable direct current output signal which varies nonlinearly with the sum of the frequencies of said input signal trains, and feedback biasing means connected to said frequency responsive net means and responsive to said varying output signal for compensating for the nonlinearity of said frequency responsive net means to thereby produce a linearly responsive direct current output including an emitter follower transistor means having its input terminal connected to respond to said direct current output signal and its output terminal connected to each of said first and second differentiating circuit means through said bridge means.

16. In the system of claim 15 further including second common emitter transistor amplifier means for producing a second output signal having a frequency which varies in accordance with the frequency of another of the input trains of signals, second clamping means including said voltage reference means for limiting the amplitude of said second output signals.

17. In the system of claim 15 further including second common emitter transistor amplifier means for producing a second output signal having a frequency which varies in accordance with the frequency of another of the input trains of signals, second clamping means including said voltage reference means for limiting the amplitude of said second output signals.

18. In a system for measuring the frequency of a plurality of trains of pulsating input signals by producing an output signal having a magnitude which varies linearly with the sum of the frequencies of the pulsating signals, the combination of common emitter transistor amplifier means for producing a first output signal having a frequency which varies in accordance with the frequency of one of the input trains of signals, second common emitter transistor amplifier means for producing a second output signal having a frequency which varies in accordance with the frequency of another of the input trains of signals, frequency responsive net means connected to said first and second transistor means respectively for producing positive and negative differentiated signals in response to said first and second output signals, and integrating circuit means responsive to said differentiated signals for producing a variable direct current output signal which varies nonlinearly with the sum of the frequencies of said input signal trains, and feedback biasing means connected to the frequency net means and responsive to said varying output signal for compensating for the nonlinearity of said frequency responsive net means to thereby produce a linearly responsive direct current output.

19. In the system of claim 18 further including bridge means for blocking at least one of said positive and negative signals.

20. In a system for measuring the frequency of a plurality of trains of pulsating input signals by producing a direct voltage having a magnitude which varies linearly with the sum of the frequencies of the pulsating signals, the combination of first common emitter transistor amplifier means for producing a first output signal having a frequency which varies in accordance with the frequency of one of the input trains of signals, a first clamping circuit including Zener diode voltage reference means for limiting the amplitude of said first output signals from said first transistor means, second common emitter transistor amplifier means for producing a second output signal having a frequency which varies in accordance with the frequency of another of the input trains of signals, a second clamping circuit including said Zener diode voltage reference means for limiting the amplitude of said second output signals, frequency responsive net means including first and second differentiating capacitors connected to said first and second transistor means respectively for producing positive and negative differentiated signals in response to said first and second output signals, a full wave bridge means for blocking at least one of said positive and negative signals, and integrating circuit means connected to said first and second differentiating circuit means including a capacitor and resistor connected in parallel for producing a variable direct voltage which varies nonlinearly with the sum of the frequencies of said input signal trains, and feedback biasing means connected to the frequency net means and responsive to said varying output signal for compensating for the nonlinearity of said frequency responsive net means to thereby produce a linearly responsive direct current output including an emitter follower transistor means having its input terminal connected to respond to said direct voltage and its output terminal connected to each of said first and second differentiating circuit means through said bridge means, said biasing means including filter means for smoothing the output of said emitter follower transistor means.

21. In a system for measuring the frequency of a plurality of pulsating input signals by producing a direct voltage having a magnitude which varies linearly with the sum of the frequencies of the pulsating input signals the combination of, means responsive to said signals including clamping circuit means for producing a plurality of pulse trains each having a fixed maximum amplitude and a frequency controlled by the frequency of the pulsating signals, low impedance means supplying current to said clamping circuit means, frequency responsive net means including means for producing a varying direct current output signal which varies nonlinearly with the frequency of the pulsating signal, and feedback biasing means connected to the frequency net means and responsive to said varying output signal for compensating for the nonlinearity of said frequency responsive net means to thereby produce a linearly responsive direct current output.

22. In the system of claim 21 further including transistor means having a collector-emitter circuit substantially defining the impedance of said low impedance means.

23. In a system for measuring the frequency of a plurality of trains of pulsating input signals by producing a direct current having a magnitude which varies linearly with the sum of the frequencies of the pulsating signals, the combination of common emitter transistor amplifier means for producing an output signal having a frequency which varies in accordance with the frequency of at least one of the input trains of signals, clamping means including voltage reference means for limiting the amplitude of said output signals from said transistor means, frequency responsive net means connected to said transistor means respectively for producing positive and negative differentiated signals in response to said output signals, low impedance circuit means for alternately supplying high current to said common emitter transistor amplifier means and said frequency responsive net means in response to the conduction state of said common emitter transistor amplifier means, and integrating circuit means responsive to said differentiated signals for producing a variable direct current output signal which varies nonlinearly with the sum of the frequencies of said input signal trains, and feedback biasing means connected to the frequency net means and responsive to said varying output signal for compensating for the nonlinearity of said frequency responsive net means to thereby produce a linearly responsive direct current output including an emitter follower transistor means having its input terminal connected to respond to said direct current output signal and its output terminal connected to each of said first and second differentiating circuit means through said bridge means.

24. In a system for developing a direct current signal which varies linearly in proportion to the frequency of an incoming signal and which includes a network having a capacitor, the voltage across which is repetitively changed from a starting voltage to a preselected final voltage and in which the magnitude of the output voltage nonlinearly affects the starting voltage, the improvement which comprises means for preventing signal-produced changes in the magnitude of said output voltage from changing said starting voltage comprising amplifier means having an output connected to respond to the direct current signal, the output of said amplifier means including feedback means connected to said capacitor to select the starting voltage to thereby produce a linearly responsive direct current output.

25. In the system of claim 24 wherein said amplifier means includes emitter-follower transistor amplifier means having its base electrode connected to respond to the direct current signal and the output electrode of said amplifier means being connected to said capacitor to select the starting voltage.

26. In a system for developing a direct current signal which varies linearly in proportion to the sum of the frequencies of incoming signals and which includes a frequency responsive network having a plurality of capacitors, the voltage across which is repetitively changed from a starting voltage to a preselected final voltage and in which the magnitude of the output voltage nonlinearly affects the starting voltage, the improvement which comprises means for preventing signal-produced changes in the magnitude of said output voltage from changing said starting voltage comprising transistor amplifier means having an output connected to respond to the varying direct current signal, the output of said amplifier means including feedback means connected to said frequency responsive network to select the starting voltage to thereby produce a linearly responsive direct current output.

27. In the system of claim 26 which further includes a clamped circuit for producing a constant amplitude pulse train in response to the incoming signal and wherein the signal voltage is determined by the constant amplitude pulse train, and wherein the improvement further includes an output electrode of said amplifier means being connected to said capacitor to set the starting voltage.

References Cited

UNITED STATES PATENTS

| | | | |
|---|---|---|---|
| 2,523,399 | 9/1950 | Stoner et al. | 324—78 |
| 2,587,755 | 3/1952 | Packard et al. | 324—78 |
| 3,134,072 | 5/1964 | Gray et al. | 324—78 |
| 3,187,202 | 6/1965 | Case | 307—233 |
| 3,197,560 | 7/1965 | Riesz | 324—78 X |

JOHN S. HEYMAN, Primary Examiner

U.S. Cl. X.R.

324—78; 328—140